(12) United States Patent
Watkins

(10) Patent No.: US 8,502,864 B1
(45) Date of Patent: Aug. 6, 2013

(54) SYSTEMS, DEVICES, AND/OR METHODS FOR VIEWING IMAGES

(76) Inventor: Robert Watkins, Charlottesville, VA (US)

( * ) Notice: Subject to any disclaimer, the term of this patent is extended or adjusted under 35 U.S.C. 154(b) by 847 days.

(21) Appl. No.: 12/510,304

(22) Filed: Jul. 28, 2009

(51) Int. Cl.
*H04N 13/04* (2006.01)

(52) U.S. Cl.
USPC .................. 348/52; 348/53; 359/469

(58) Field of Classification Search
None
See application file for complete search history.

(56) References Cited

U.S. PATENT DOCUMENTS

| | | | | |
|---|---|---|---|---|
| 3,632,194 A | * | 1/1972 | Myles | 352/200 |
| 4,003,645 A | * | 1/1977 | Broeckl et al. | 352/109 |
| 4,116,533 A | * | 9/1978 | Nerlich | 359/469 |
| 4,594,614 A | * | 6/1986 | Frank et al. | 348/97 |
| 4,670,744 A | | 6/1987 | Buzak | |
| 4,966,454 A | * | 10/1990 | Toporkiewicz | 352/59 |
| 5,078,486 A | * | 1/1992 | Evans | 351/243 |
| 5,701,154 A | | 12/1997 | Dasso | |
| 5,774,263 A | * | 6/1998 | Roy et al. | 359/469 |
| 6,177,952 B1 | * | 1/2001 | Tabata et al. | 348/47 |
| 6,188,442 B1 | * | 2/2001 | Narayanaswami | 348/564 |
| 6,252,623 B1 | | 6/2001 | Lu et al. | |
| 6,646,623 B1 | | 11/2003 | Chakrabarti | |
| 6,690,338 B1 | * | 2/2004 | Maguire, Jr. | 345/8 |
| 7,068,416 B2 | | 6/2006 | Gim et al. | |
| 7,265,775 B2 | | 9/2007 | Hirayama | |
| 2002/0126396 A1 | | 9/2002 | Dolgoff | |
| 2006/0092272 A1 | * | 5/2006 | Wolowelsky et al. | 348/42 |
| 2007/0035619 A1 | * | 2/2007 | Yoon | 348/47 |

FOREIGN PATENT DOCUMENTS

WO  98/54602  12/1998

* cited by examiner

*Primary Examiner* — Moustafa M Meky
*Assistant Examiner* — Clayton R Williams

(57) ABSTRACT

Certain exemplary embodiments can provide a method comprising, via a signal, triggering an illumination of a first light source and a second light source, the first light source adapted to lighten a first image, the second light source adapted to lighten a second image, the first image rendered side-by-side with the second image.

21 Claims, 11 Drawing Sheets

1000

SYSTEMS, DEVICES, AND/OR METHODS FOR VIEWING IMAGES

CROSS-REFERENCES TO RELATED APPLICATIONS

This application claims priority to, and incorporates by reference herein in its entirety, pending U.S. Provisional Patent Application Ser. No. 61/191,271, filed 8 Sep. 2008.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method comprising, via a signal, triggering an illumination of a first light source and a second light source, the first light source adapted to lighten a first image, the second light source adapted to lighten a second image, the first image rendered side-by-side with the second image.

Figure 1:
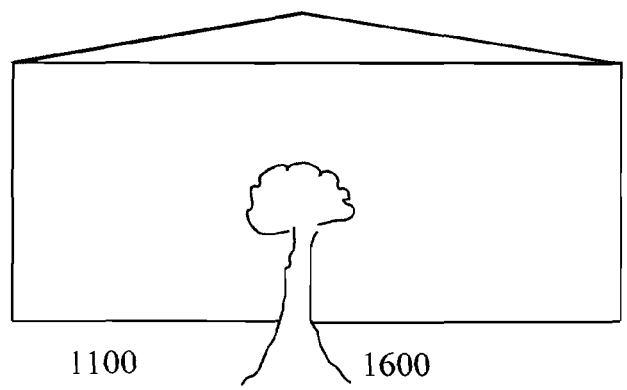
FIG. 1 is a side view of an exemplary embodiment of a system 1000.
Figure 1:
Figure 1:
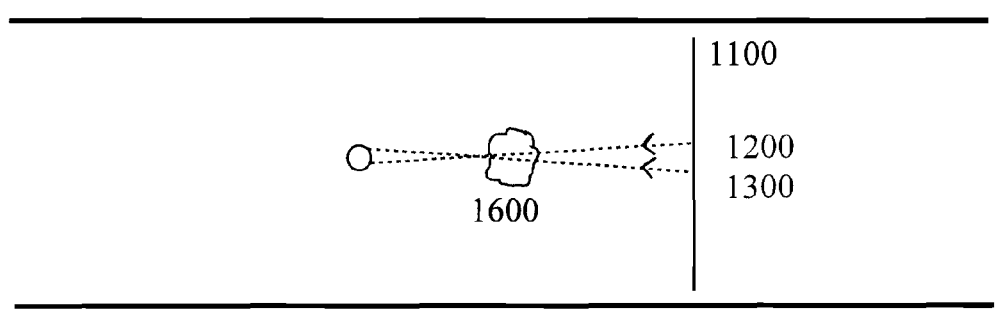
Figure 1:
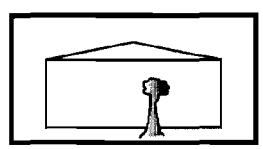
Figure 1:
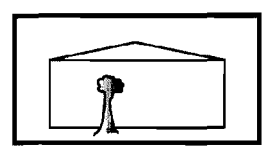

FIG. 1 is a side view of an exemplary embodiment of a system 1000, which can comprise a house 1100 and a tree 1600. System 1000 can be illustrative as to an individual's ability to discern scenes in three dimensional viewing. For example, an individual's left eye can see a scene comprising house 1100 tree 1600 further right against house 1100 via field of view 1300, which can result in left eye image 1400; whereas the individual's right eye can see tree 1600 further to left relative to house 1100 via field of view 1200, which can result in right eye image 1500. The brain can fuse the two images into a single view, with tree 1600 appearing to be closer and house 1100 appearing to be further away.

Certain exemplary methods can be broadly divided into the following four categories. There are minor variations on each of these methods, so this is not an exhaustive list. For purposes of this summary, full-color means the colors of a natural scene as they would appear to the naked eye, with no and/or few compromises to accommodate peculiarities of reproduction methods.

In certain diffractive methods, such as "ChromaDepth", glasses can send different colors of light in different directions, so that some colors appear further away than other colors, creating an illusion of depth. Such methods might not be amenable to viewing full-color images.

In certain spatially separated left-and-right images, such as the "View-Master", and stereographic cards, a left eye might see only the left image, and right eye might see only the right image, so filtering might not be used. Such embodiments can allow for full-color scene viewing.

Certain lenticular displays can incorporate an array of tiny lenses, sometimes described as having a "corduroy" look or feel, that send slightly different images to different angles. Since eyes can have an angular separation, each eye can view a slightly different image. Such embodiments can be used for full-color scene viewing such as for movie posters, DVD box covers, and greeting cards.

In certain exemplary embodiments, autostereograms, upon casual inspection, can appear to be random dot patterns, but actually can be a subset of dots have been shifted slightly from the others. If the viewer focuses at infinity, which requires some practice, an illusion of depth can be created. In simple forms such embodiments can be used with full-color.

In wiggle stereoscopy a scene can alternately display left-eye and right-eye images, changing several times per second. Certain exemplary embodiments can be displayed on a computer or similar device. Certain exemplary embodiments can display full-color.

In certain exemplary embodiments, blue/red glasses, also known as anaglyphs can be used. A variation thereof can be used in "Colorcode-3D". Different colors can be used for the left-eye and right-eye images, so two images appear to lie on top of one another, with the colored glasses filtering an unwanted image for each eye. Certain exemplary embodiments can display a semblance of full-color, with compromises.

Certain exemplary embodiments can utilize active glasses, such as LCD shutter glasses. In certain exemplary embodiments, a video display can alternate left-eye and right-eye images, and glasses can alternately block one of the images via a wired or wireless connection to the display. Certain exemplary embodiments can allow for full-color. Certain exemplary embodiments can comprise a head-mounted display in which there is a separate video display for each eye.

Certain exemplary embodiments can utilize polarizing glasses. Certain exemplary embodiments can utilize two projectors to substantially superimpose a left-eye and right-eye image on a screen, each with the light polarized perpendicularly to the other. Linearly-polarized glasses can filter out an unwanted image for each eye. Certain exemplary embodiments can utilize a single projector with left-eye and right-eye images alternating, each with light of a different (clockwise or counter-clockwise) circular polarization. Circularly polarized glasses can filter out the unwanted image going to each eye. Certain exemplary embodiments can be used in "Real-D Cinemas" and/or can display full-color.

Certain exemplary embodiments can utilize the Pulfrich effect and use one light and one darker lens on viewing glasses. In certain exemplary embodiments the human eye can perceive a darker image slightly later in time than a brighter image. Such embodiments can display full color, but scene contrast can be compromised.

In certain lenticular displays a video monitor can be outfitted with a covering containing the array of special lenses. The right and left eyes of the viewer can receive slightly different images such as are used in a "WOWvx" system.

Certain exemplary embodiments can utilize left-eye and right-eye images, which are spatially separated, so no special glasses are required, meaning there is little or no eye strain. Certain exemplary embodiments can display full-color with few and/or no compromises in contrast. Certain exemplary embodiments can utilize few moving parts, so there is very little wear on the mechanism. Each image can be "frozen" in place by brief flashes of light. Certain exemplary embodiments can only be used by one viewer at a time. In such embodiments a user can feel immersed in the scene being viewed, and forgets, for the moment, that the outside world exists. Certain exemplary embodiments can be relatively inexpensive to produce: a few dollars per device, as compared to thousands of dollars for certain lenticular video displays.

Certain exemplary embodiments can allow viewing of full-color 3-D motion pictures by a single user. "3-D" is a common term denoting the sensation of depth that is a feature of normal human vision, but which is achieved with 2-D images. The series of 2-D images, properly constructed and displayed, can fool the human vision system into thinking it is looking at a scene with true depth. Certain exemplary embodiments can achieve a substantially 3-D appearance by placing a series of "left-eye" and "right-eye" images side-by-side, and viewing the series of "left-eye" and "right-eye" images in rapid succession with an optical magnifier. The images can move substantially continuously. Certain exemplary embodiments can have relatively simple mechanics, with few and/or no pins or gears for intermittent motion, such as in a "Maltese cross." Certain exemplary embodiments do not require any special glasses, colored or otherwise, nor utilize any polarization of light.

When using the viewer, a series of images can move relatively rapidly past the eyes, such as by turning a crank by hand, activating a motor, beginning a rendering via a user interface of pairs of camera captured and/or computer generated images, etc. The user can view these images through a separate lens system for each eye, consisting of either a single convex lens, or a doublet of such lenses. If the images in each pair are closer together than human eyes, a system of mirrors, which can be "first surface" type to eliminate ghosting, and/or information device generated corrections, can widen the spacing.

Viewed in ordinary room light, certain images can look blurry as they passed in front of the eyes. Certain exemplary embodiments can utilize an electronic circuit that switches light sources, such as white light emitting diodes (LEDs), on and off very rapidly, giving a very brief burst of light, which can be used to illuminate the images, instead of ambient room light. The burst can be so short in duration that the image moves a very small distance during this time, and thus appears to the eye to be "frozen." A series of these left- and right-eye "frozen" images, viewed in rapid succession, give the viewer the illusion of 3-D motion occurring before his or her eyes.

An exemplary image size for the viewer can be 1 cm by 2 cm. This can provide a relatively high image quality if photographic film is used, giving, for example, 1080×1920 pixels, which can be considered "high definition" quality. At 1 cm by 2 cm, and 20 frames per second, a 10-second movie can be approximately 200 cm in length. Such a movie could be rolled up into a relatively compact cartridge.

In certain exemplary embodiments, the viewer can also be used to view 3D still images, simply by causing the illumination to be on all the time, instead of intermittently. A switch, such as switch 8500 of FIG. 8 can be used to provide such illumination. The user can bring a left-eye and right-eye pair of images into view, and leave them in position to view for as long as desired.

Certain exemplary embodiments can provide a 3D motion picture viewing system utilizing spatially separated left-eye and right-eye images that move substantially continuously and are illuminated with a broad-spectrum light source of short duration, and which require no polarization or color filters.

In certain exemplary embodiments, each image pair can be lit by a relatively brief (approximately $0.5 \times 10^{-4}$ seconds) flash of light. Via such light flashes, motion of the roll of images can appear as "frozen."

In certain exemplary embodiments, images can be printed on paper, on transparent film, black-and-white, color, large, and/or small. Image pairs can have a substantially similar separation as the human eyes, or have a different separation. In the latter case, lenses, minors (first-surface or other) and/or prisms can be used to effectively change the separation before optics magnify images for viewing.

The images can be laid out on a vertically or horizontally traveling roll, on a circular shape, and/or can be stored in a memory device and rendered by one or more user interfaces. A hand-crank can be used to advance through the images, or the device may be motorized. There is no limit to the duration of a 3D motion picture. This is determined, in the case of a roll of images, on the length of the roll.

Simple magnifying (double-convex) lenses can be used, one per eye. Or a pair of closely-spaced convex lenses, sometimes called a doublet, but not to be confused with the achromatic doublet, can be used. Such embodiments have an advantage of making the virtual image appear to be distant, which causes less eye strain. Other optical arrangements are possible also.

Each image pair can be illuminated by a brief flash of light, the triggering of which can be done at a precise moment when a given image pair appears before the eyes of the viewer. Such illumination can be accomplished in many ways, which can be electrical and/or mechanical.

Electrical means can comprise having the image medium interrupt, or reflect, a light source (separate from the illuminating source) at the moment the images are to be illuminated. However, the trigger can occur earlier as long as a delay is built-in, so that the illumination occurs at the correct moment.

Mechanical means can comprise having a protrusion from the image medium push a switch closed, and then allow the switch to open again, as the images advance.

Figure 2:
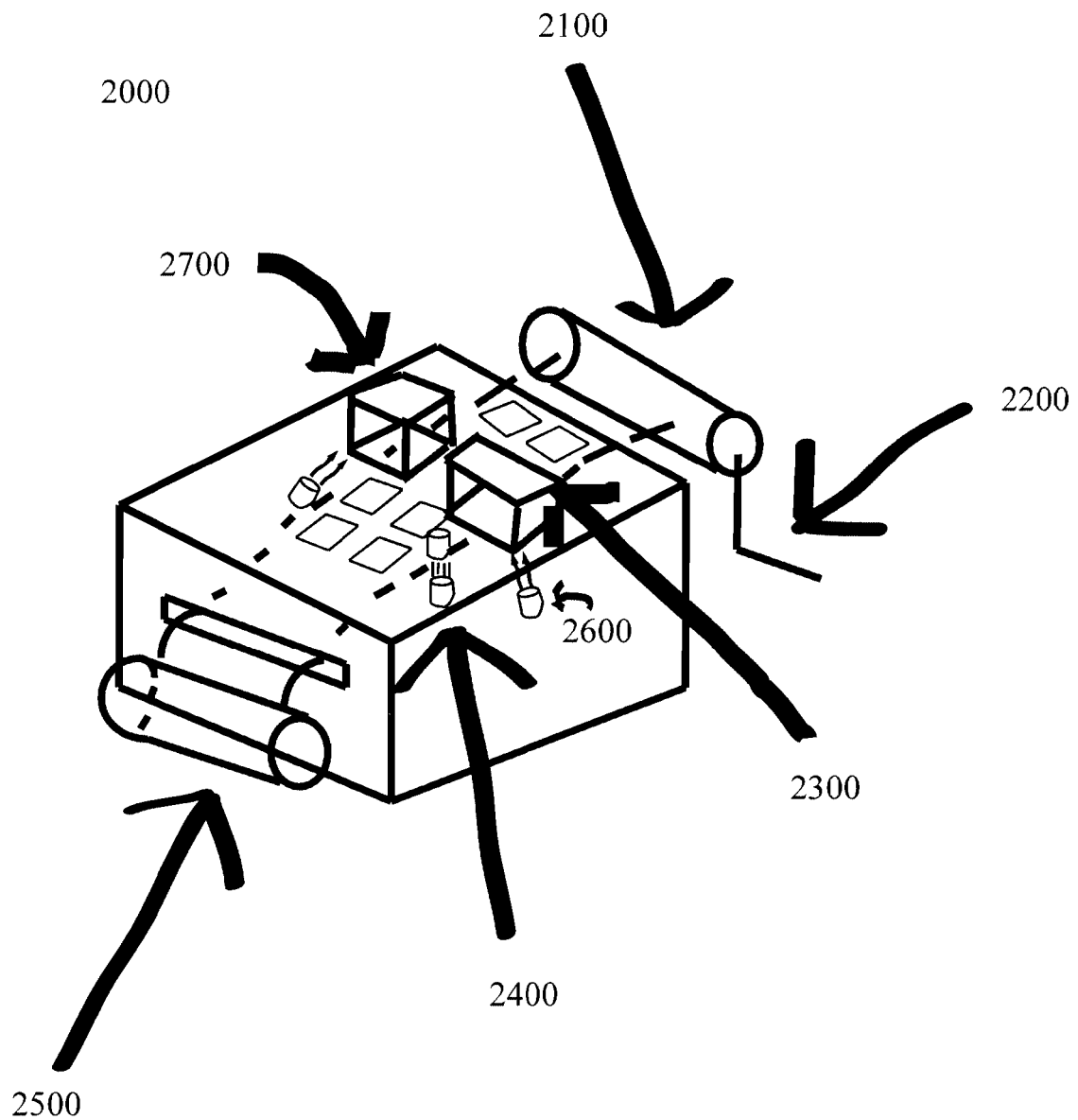
FIG. 2 is a block diagram of perspective view of an exemplary embodiment of a system 2000.

FIG. 2 is a block diagram of perspective view of an exemplary embodiment of a system 2000, which can comprise a first image aperture 2700, a second image aperture 2300, light sources 2600, and an infrared LED 2400. In system 2000, a series of images moves rapidly past the eyes, by turning a crank 2200 that unrolls media, such as paper, on which these images are printed from supply reel 2500 to take-up reel 2100. Viewed in ordinary room light, these images would look blurry as they passed in front of the eyes. To overcome this, an electronic circuit can be constructed (see system 8000 of FIG. 8 for an exemplary embodiment of such a circuit) that switches light sources 2600, which can be white LEDs (light emitting diodes), on and off very rapidly, giving a very brief burst of light, which is used to illuminate the images, instead of ambient room light. The burst was relatively short in duration such that the image moved a very small distance during this time, and thus appeared to the eye to be still. A series of these left- and right-eye "still" images, viewed in rapid succession, gave the viewer the illusion of 3-D motion occurring before a user's eyes. Infrared LED 2400 can comprise and/or be associated with a phototransistor. A beam of infrared light from IR LED 2400 can be interrupted and un-interrupted as images stream by, which can in turn be used to trigger flashes of light from light sources 2600.

An exemplary prototype embodying principles of system 2000 was constructed and comprised two pieces of wood, each approximately 12 inches×6 inches×¼ inch thick, which were bound together, separated by a thin metal spacer approximately 1 mm thick. This allowed the paper holding the images to pass through. Holes for viewing the images were cut entirely through the top piece of wood, but not at all through the bottom piece of wood. Supports were attached to the top piece in order to hold the white LEDs, which provided illumination of the images from above. The prototype provided very bright images, which were viewed in full-color. The hole for the infrared (IR) LED was tapered, so that the IR LED itself was only partially inserted, but a small hole was drilled all the way through, allowing the IR light to pass. A similar tapered hole was drilled on the reverse, which allowed a Photo-transistor to detect the IR light. In this way the paper holding the images passed through unimpeded, but the IR light was able to pass through the small holes piercing the paper.

Figure 3:
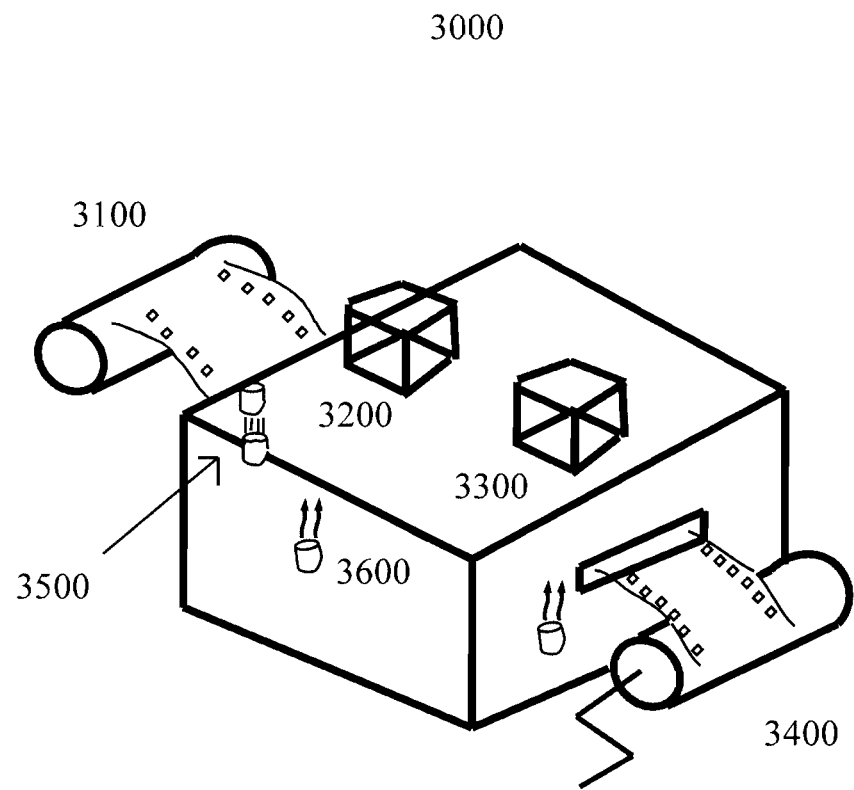
FIG. 3 is a block diagram of perspective view of an exemplary embodiment of a system 3000.

FIG. 3 is a block diagram of perspective view of an exemplary embodiment of a system 3000, which can comprise a first image aperture 3200, a second image aperture 3300, a supply real 3100, a take-up reel 3400, an IR LED 3500, and light sources 3600. Light sources 3600 can be adapted to provide illumination to images viewed by a user through first image aperture 3200 and second image aperture 3300.

Figure 4:
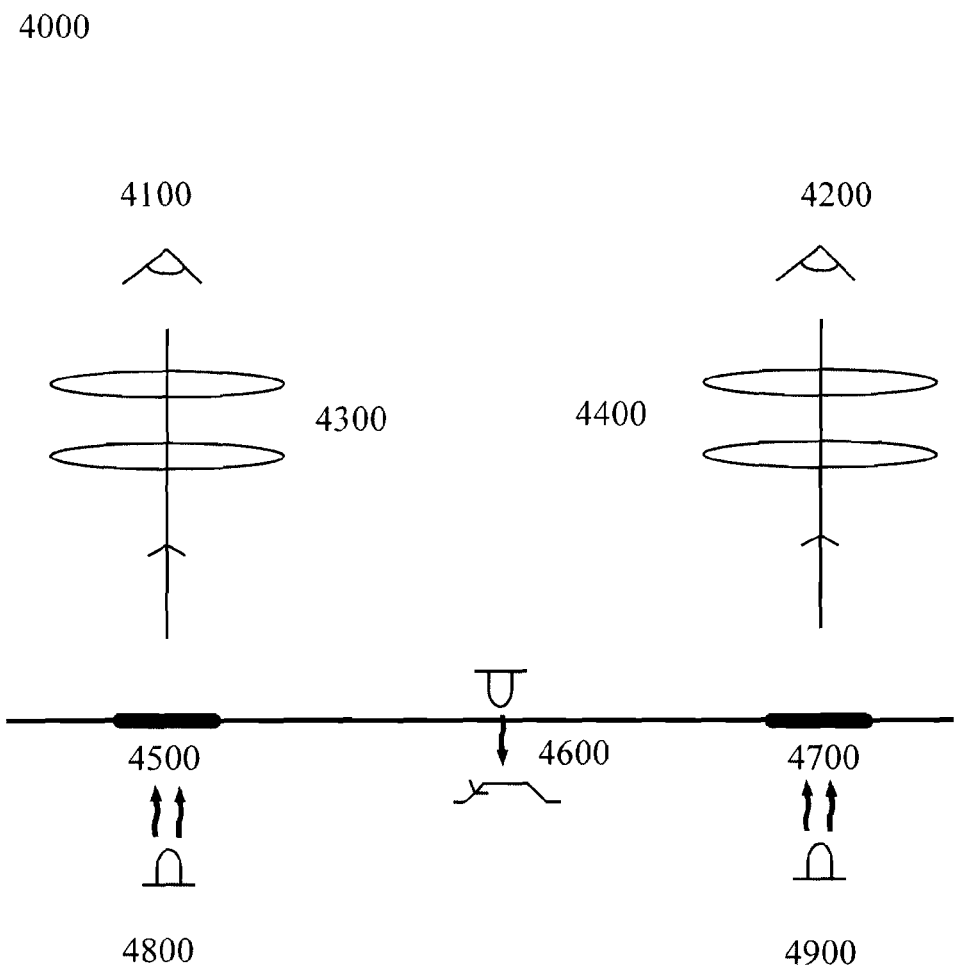
FIG. 4 is a block diagram of an exemplary embodiment of a system 4000.

FIG. 4 is a block diagram of an exemplary embodiment of a system 4000, which can comprise a first set of optics 4300 and a second set of optics 4400. Each of first set of optics 4300 and second set of optics 4400 can comprise one or more lenses. A center-to-center spacing between images 4500 and 4700 can be chosen to approximately match that of human eyes 4100 and 4200. With such spacing, relatively simple optics might be used to view images 4500 and 4700. In an exemplary prototype, simple convex magnifying lenses, one for each eye, can be used, from a few inches above the images. Certain exemplary embodiments do not use-colored glasses, or polarization of light. Images 4500 and 4700 can be illuminated via one or more light sources, such first light source 4800 and second light source 4900, each of which can be white LEDs. First light source 4800 and/or second light source 4900 can be illuminated to provide a burst of light responsive to a trigger from phototransistor 4600.

A scene containing motion can be filmed with two digital video cameras running continuously, placed side-by-side. Such an arrangement can capture information for both the left images and the right images substantially simultaneously. Spacing of the video cameras, measured between lens centers, can be approximately 2½ inches. After a scene is filmed, an information device can be used to capture both a left-eye frame and a right-eye frame spaced at approximately every ½oth of a second during a duration of the scene. Images can be printed onto film and/or paper.

Figure 5:
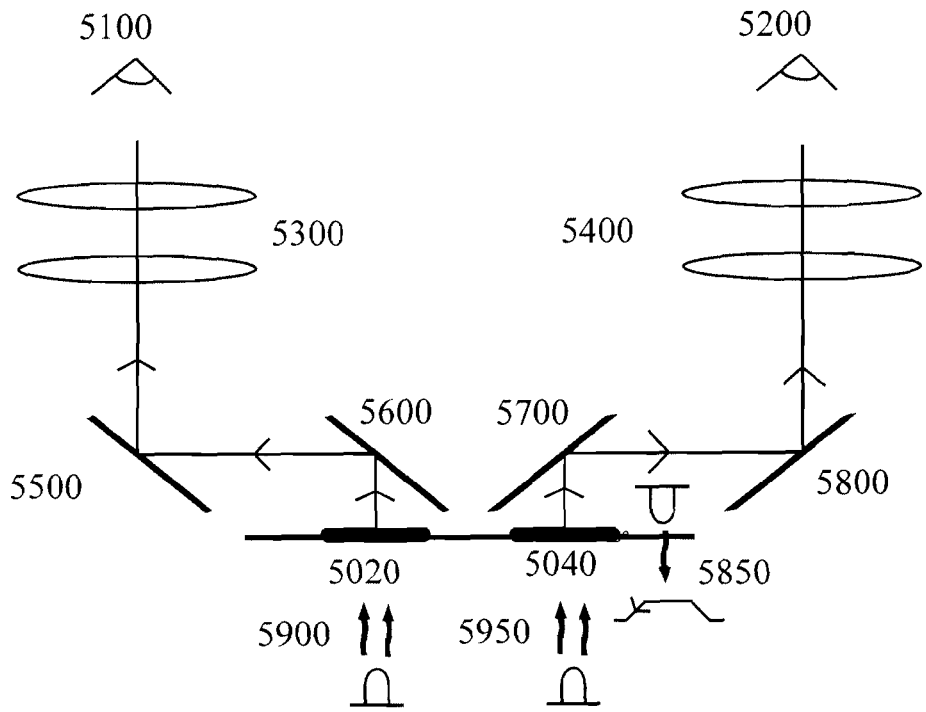
FIG. 5 is a block diagram of an exemplary embodiment of a system 5000.

FIG. 5 is a block diagram of an exemplary embodiment of a system 5000, which can comprise a first user eye 5100 and a second user eye 5200. First user eye 5100 can view a first image 5020 through a first lens system 5300 via a first mirror 5500 and a second mirror 5600. First image 5020 can be illuminated via a first light source 5900, which can be an LED. Second user eye 5200 can view a second image 5040 through a second lens system 5400 via a third mirror 5800 and a fourth mirror 5700. Second image 5040 can be illuminated via a second light source 5950, which can be an LED. In certain exemplary embodiments, first light source 5900 and second light source 5950 can be adapted to, respectively, illuminate first image 5020 and second image 5040. First image 5020 and second image 5040 can be spaced differently than an exemplary spacing between human eyes. For example, the centerlines can be closer together than human eyes. A combination of first lens 5300, first mirror 5500, and second mirror 5600 used in conjunction with a combination of second lens system 5400, third mirror 5800, and fourth mirror 5700 can optically compensate for spacing between the images such that first image 5020 and second image 5040 appear to the user at an approximate spacing between centerlines of first user eye 5100 and second user eye 5200.

Figure 6:
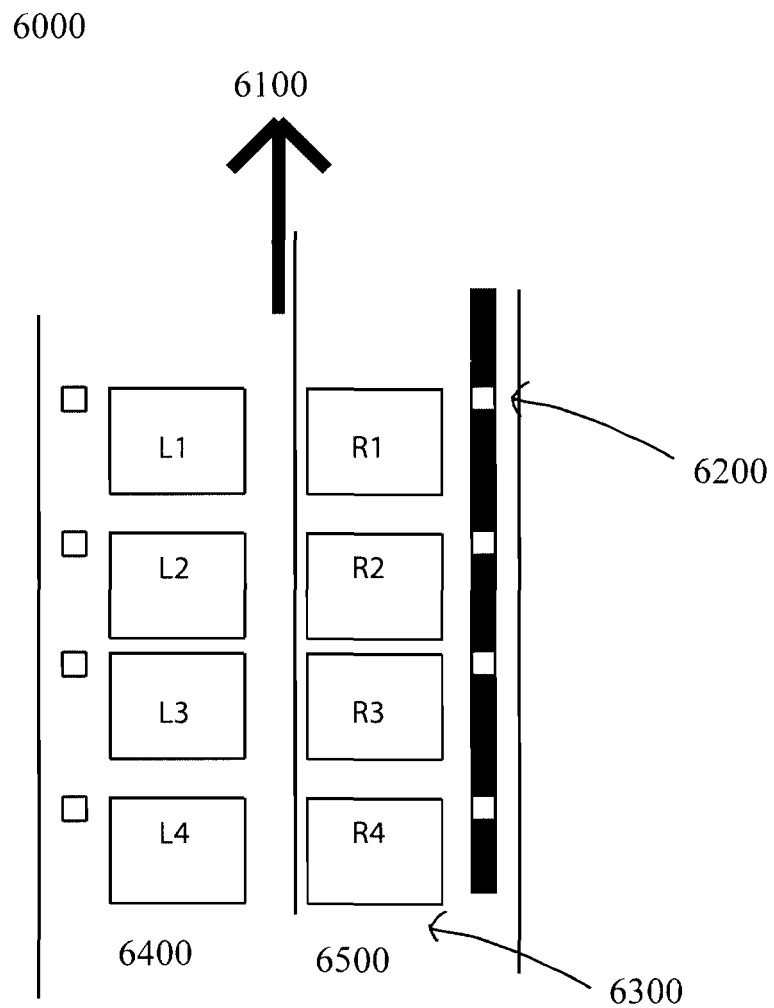
FIG. 6 is a block diagram of an exemplary embodiment of a system 6000.

FIG. 6 is a block diagram of an exemplary embodiment of a system 6000, which can comprise film 6300 comprising first sequential series of images 6400 and second sequential series of images 6500. First sequential series of images can comprise L1, L2, L3, and L4. Second sequential series of images 6500 can comprise R1, R2, R3, and R4. For each left-right image pair, there exists a small hole 6200 in film 6300, which can allow IR light to pass through and trigger the brief illumination of film 6300 via LEDs, such as white LEDs. Holes 6200 piercing film 6300 can be surrounded by material that is substantially opaque to IR light, such as can be possible with paper covered by opaque ink, which can substantially block IR light transmission. Thus IR light can be transmitted to a Photo-transistor only when one of these small holes is lined up with the "IR light passes" line 5850 in FIG. 5. A supply reel and take-up reel with a hand crank can provide a means for passing images through a viewer in a direction of travel 6100.

Figure 7:
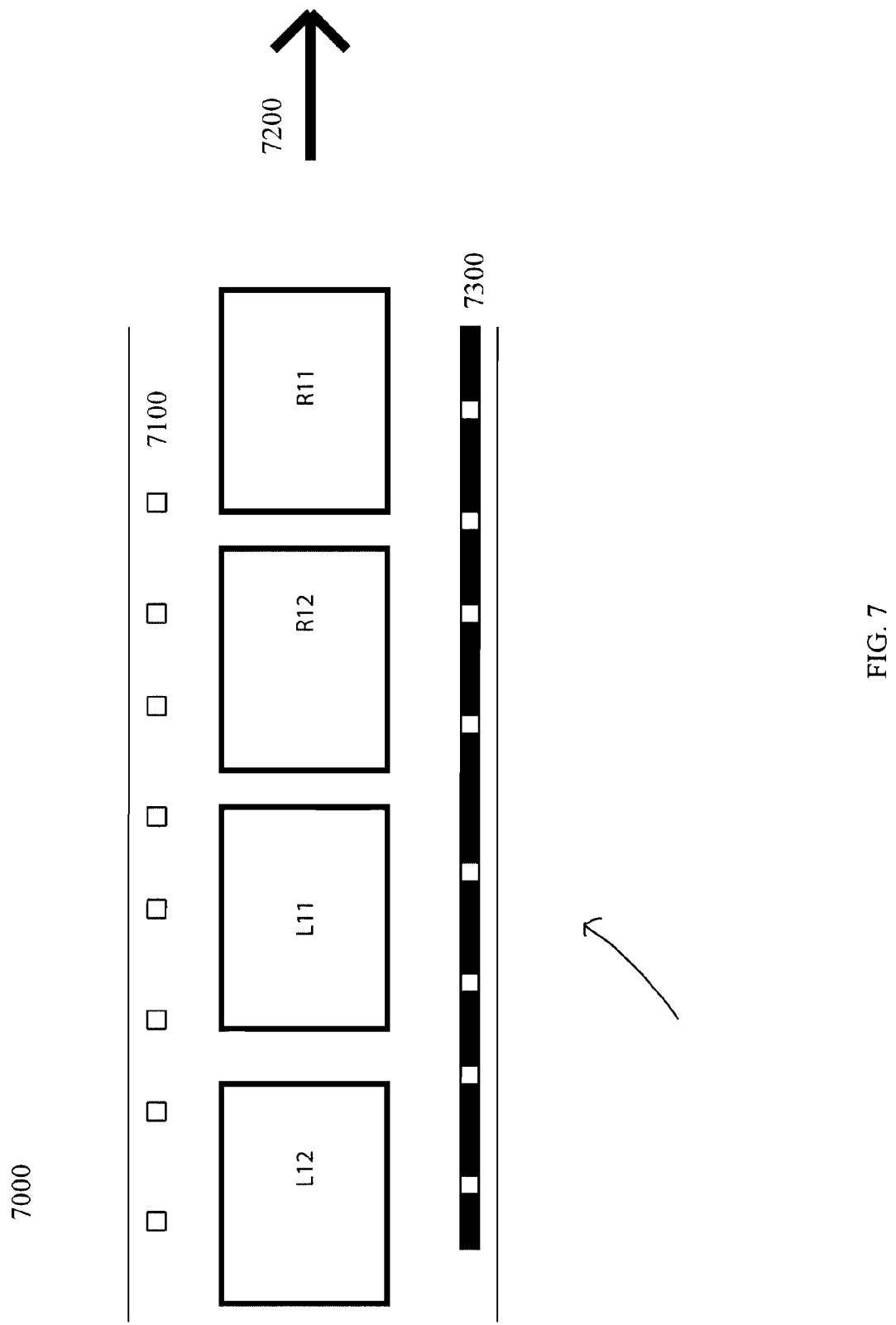
FIG. 7 is a block diagram of an exemplary embodiment of a system 7000.

FIG. 7 is a block diagram of an exemplary embodiment of a system 7000, which can comprise a film 7100. Film 7100 can be transversely moved through a viewer in a direction of travel 7200 to place image pairs L11 and R11 in a view of lenses of the viewer and subsequently place image pairs L12 and R12 in the view of the lenses of the viewer.

Figure 8:
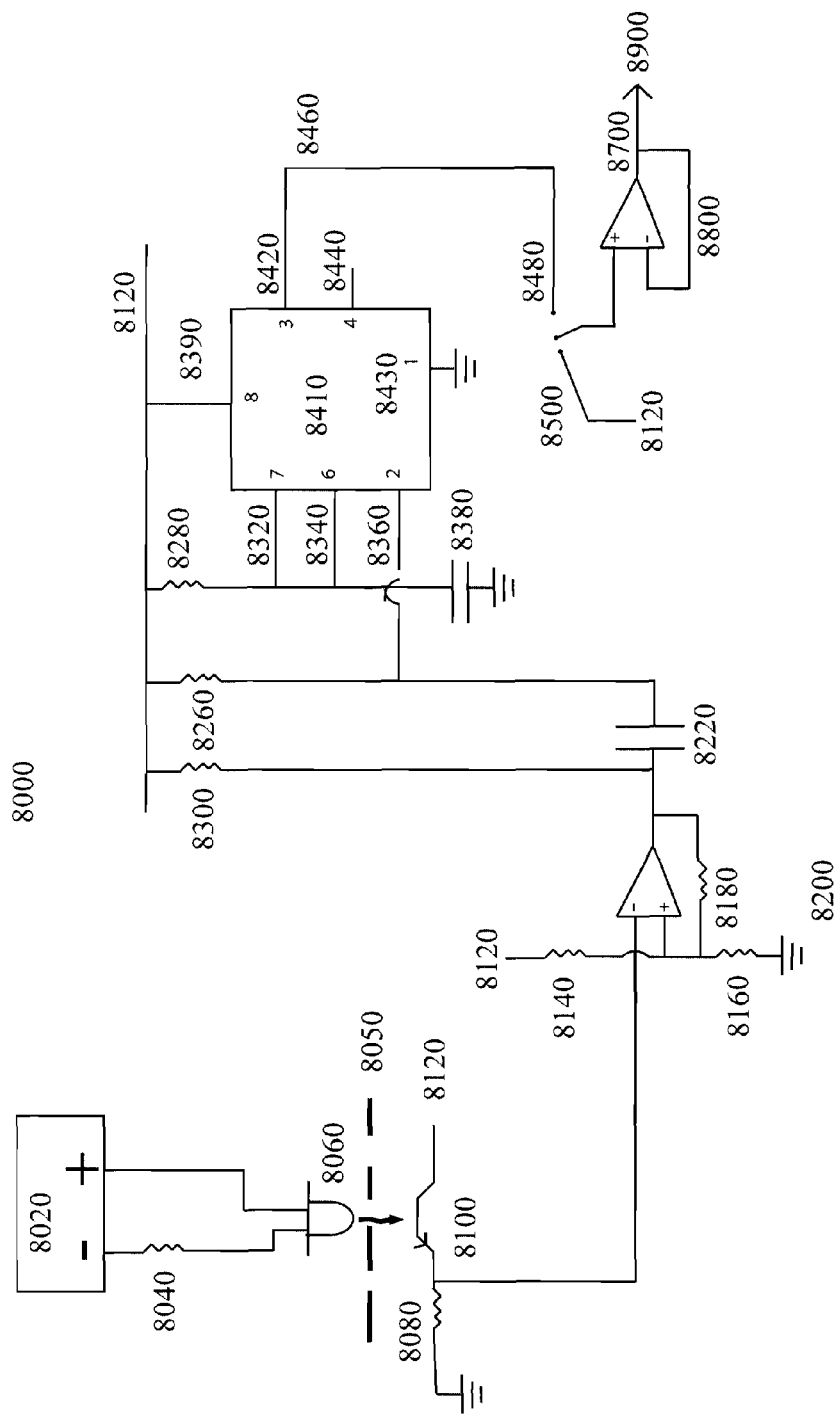
FIG. 8 is an electrical schematic diagram of an exemplary embodiment of a system 8000.

FIG. 8 is an electrical schematic diagram of an exemplary embodiment of a system 8000, which can be a substantially complete circuit for an exemplary viewer. System 8000 can comprise an electrical energy source 8020, which can be adjustable such that infrared light from an IR LED 8060 substantially does not penetrate through an image medium 8050 unless a hole is present therein. In certain exemplary embodiments, electrical energy source 8020 can have an output voltage between approximately four volts and approximately nine volts. Electrical energy source 8020 can be electrically coupled to IR LED 8060 via a first resistor 8040, which can have a resistance of approximately 150 ohms.

When a hole in image medium 8050 is lined up between IR LED 8060 and photo-transistor 8100, an output of photo-transistor 8100 can trigger a Schmitt trigger 8200. Photo-transistor 8100 can be electrically coupled to a ground circuit via a second resistor 8080, which can have a resistance of approximately five kilo-ohms. Photo-transistor 8100 can be electrically coupled to a voltage source 8120, which can be adapted to bias photo-transistor 8100 with a voltage of approximately nine volts.

Schmitt trigger 8200 can be electrically coupled to electrical voltage source 8120 via a third resistor 8140, which can have a resistance of approximately 22 kilo-ohms. A positive input of Schmitt trigger 8200 can be electrically coupled to a ground circuit via a fourth resistor 8160, which can have a resistance of approximately 12 kilo-ohms. An output of Schmitt trigger 8200 can be electrically coupled to the ground circuit via a fifth resistor 8180, which can have an electrical resistance of approximately 47 kilo-ohms. Schmitt trigger 8200 can provide a relatively sharp transition which in turn negative-edge triggers timer 8410, which can be a 555 timer. The output of Schmitt trigger 8200 can be electrically coupled to timer 8410 via a first capacitor 8220, which can have a capacitance of approximately 0.01 microfarads. The output of Schmitt trigger 8200 can be electrically coupled to timer 8410 via a sixth resistor 8260 and a seventh resistor 8300, each of which can have an electrical resistance of approximately 12 kilo-ohms.

A discharge input 8320, a threshold input 8340, and a trigger input 8360, of timer 8410 can be electrically coupled to voltage source 8120 via an eighth resistor 8280, which can have an electrical resistance of approximately 10 kilo-ohms. Discharge input 8320, threshold input 8340, and trigger input 8360 of timer 8410 can be electrically coupled to a ground circuit via a second capacitor 8380, which can have a capacitance of approximately 0.01 microfarads. Timer 8410 can be substantially directly coupled to voltage source 8120 via a first voltage input 8390. Timer 8410 can be electrically coupled to a ground circuit via a ground input 8430. Reset input 8440 to Timer 8410 can be coupled to a voltage source of approximately +9 volts. Output 8420 of timer 8410 can be energized for a predetermined period of time desired for illumination of a light source, such as, for example, approximately 0.05 milliseconds.

The duration of time that output 8420 of timer 8410 is energized may be adjusted within a large range. This duration can be calculated as follows. The 3-D movie should be viewed at a fairly high frame rate so that flickering is minimized. The light sources can then flash with a short enough duration that the image moves very little during this time, and thus appears to be approximately still, or "frozen," to the eye. As an example, if 20 frames per second is chosen, and each image is 1 cm high, the image medium will move continuously at about 20 cm/s. If the images are to move only $\frac{1}{1000}$th of the frame height (0.001 cm) during the illumination, this a flash duration 8460 of approximately $0.5 \times 10^{-4}$ seconds can be desirable. The output of the timer 8410 can be electrically coupled to an op-amp follower 8800 that can cause illumination of the light sources.

In certain exemplary embodiments, a switch 8500 can control a flow of electrical energy 8900 to the light sources. Switch 8500 can be electrically coupled to voltage source 8120. When switch 8500 causes voltage source 8120 to be electrically coupled to op-amp follower 8800, the light sources will be energized substantially continuously via op-amp follower output 8700. When switch 8500 causes op-amp follower 8800 to be electrically coupled to timer 8410 to view a motion picture viewing output 8480, op-amp follower output 8700 will be regulated by IR LED 8060 and will cause intermittent illumination of the light sources via flow of electrical energy 8900.

Certain exemplary embodiments can utilize one white LED on each side, pointed towards the images. More LEDs can be used if a brighter image is desired.

Certain exemplary working models that were constructed were much larger and heavier than a final, commercially practical device would be. Thus, miniaturization can be used in alternative embodiments. In certain exemplary embodiments, electronics can easily be packaged in a far smaller volume, as can the mechanical components. A concern when deciding on the final size is image quality. The images an exemplary prototype were printed with an Hewlett Packard brand HP 8750 printer (available from Hewlett-Packard Company, 3000 Hanover Street, Palo Alto, Calif. 94304-1185), which provided an image resolution of approximately 1200 pixels per inch. For the image size used in the prototype, this translated to about 1800×2700 pixels. Thus, the quality was better than the current "Full HD high definition" television standard of 1080×1920. Motion picture film has at least a resolution of 100 lines per mm. Maintaining at least 1080×1920 pixels would require each image to therefore be no larger than approximately 1 cm×2 cm (about the size of an adult human thumbnail), and images could be significantly smaller if higher resolution film is used, or lower image quality is accepted. At approximately 1 cm×2 cm, and approximately 20 frames per second, a 10-second movie would be only approximately 200 cm in length. Film comprising the images could be rolled up into a compact cartridge.

Other arrangements of the images are possible; for example a circular disk that rotates, bringing the image pairs underneath the viewing optics. The overriding goal will be to make the product compact, lightweight, handheld, and portable.

Certain exemplary embodiments can add synchronized sound. Certain embodiments show silent movies, but sync sound can easily be added, such as with a magnetic or optical sound track on the edge of the film or paper holding the images. Because the images move continuously, adding the soundtrack is relatively easy.

In certain exemplary embodiments, the IR LED arrangement can be replaced, for example, if contamination to the circuit by room light is not a factor. Furthermore, many variations on the electronic circuit that cause white LEDs to be illuminated for short duration are possible.

Other light sources can be used. For example, any broad-spectrum light-source capable of short duration can be used.

In an exemplary prototype, image transport was via a hand-crank. In certain exemplary embodiments, the hand-crank is can be replaced by a motorized and/or electronic transport, which can be small, quiet, and reliable.

Figure 9:
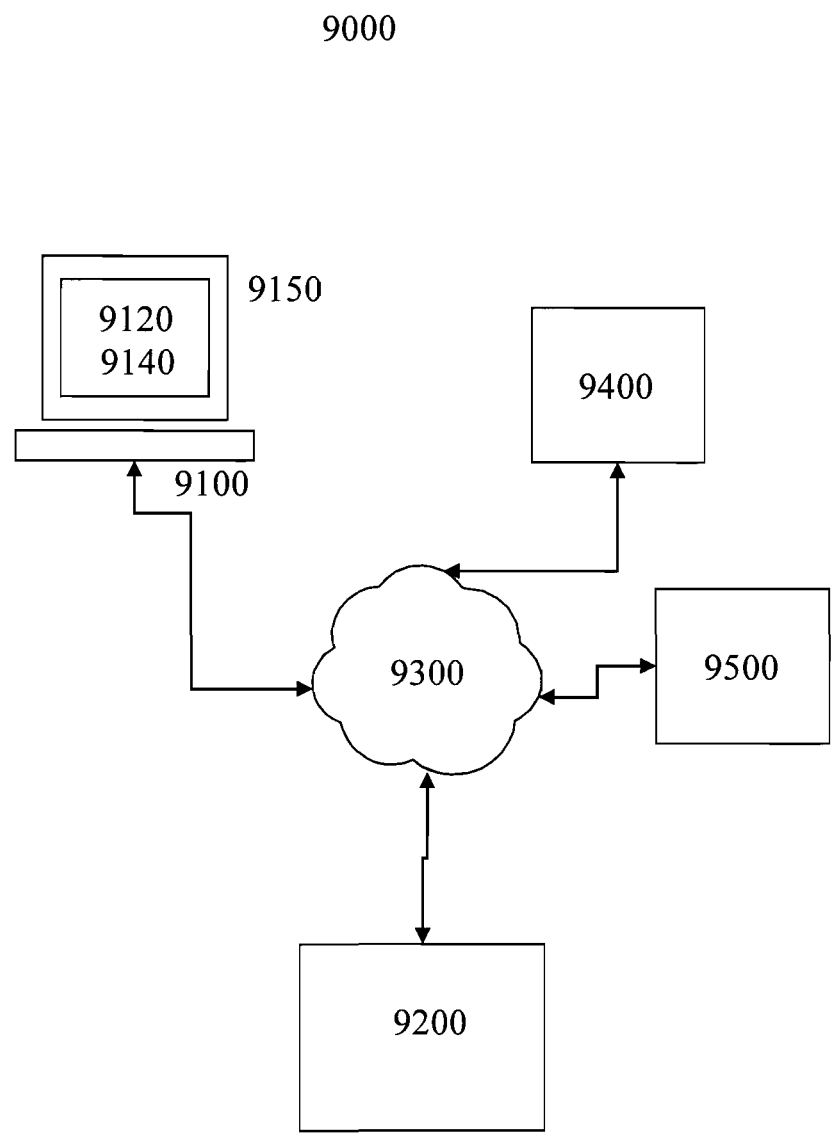
FIG. 9 is a block diagram of an exemplary embodiment of a system 9000.

FIG. 9 is a side view of an exemplary embodiment of a system 9000, which can comprise a first camera 9400 and a second camera 9500. First camera 9400 and second camera 9500 can be adapted to obtain pairs of images, which can be viewed via viewer 9200. System 9000 can be adapted to render a representation of motion of objects a having a three dimensional appearance without colored glasses or polarized glasses.

In certain exemplary embodiments, first camera 9400 and second camera 9500 can be communicatively coupled to an information device 9100 and/or viewer 9200 via a network 9300. First camera 9400 and/or second camera 9500 can be adapted to transmit image information to information device 9100 and/or viewer 9200 for storage in a memory device. Information device 9100 can comprise a user program 9150. User program 9150 can comprise a first image generator 9120 and a second image generator 9140. Information device 9100 can be adapted to control a rendering of a first sequential series of images (such as first sequential series of images 6400 of FIG. 6) and a second sequential series of images via viewer 9200 (such as second sequential series of images 6500 of FIG. 6). In certain exemplary embodiments, first image generator 9120 and second image generator 9140 can be adapted to provide computer generated images to viewer 9200. In such embodiments, first image generator 9120 and second image generator 9140 can simulate camera images taken from perspectives separated in distance by approximately a separation between human eyes.

Viewer 9200 can comprise a first image aperture (such as first image aperture 2700 of FIG. 2), a second image aperture (such as second image aperture 2300 of FIG. 2), a first light source (such as first light source 4800 of FIG. 4), and a second light source (such as second light source 4900 of FIG. 4). The first light source can be adapted to, based upon a received signal corresponding to a first image of a first sequential series of images, lighten the first image of the first sequential series of images. The first sequential series of images can be viewable via the first image aperture. The received signal one of a plurality of received signals, each of which can correspond to an image of the first sequential series of images.

The second light source can be adapted to, based upon the received signal, lighten a first image of the sequential series of images. The second sequential series of images can be viewable via the second image aperture. The first image of the first sequential series of images can be rendered side-by-side with the first image of the second sequential series. The first sequential series of images can be obtained via a first image generator. The second sequential series of images can be obtained via a second image generator. The first image generator can be adapted to obtain the first sequential series of images from a first image perspective. The second image generator can be adapted to obtain the second sequential series of images from a second image perspective. A distance between the first image perspective and the second image perspective can be established based upon optical characteristics of the viewer. The first sequential series of images and the second sequential series of images can be stored and/or imprinted on media.

In certain exemplary embodiments, instead of light sources, viewer 9200 can comprise a pair of user interfaces, such as liquid crystal displays. In such embodiments, the first sequential series of images can be rendered on a first user interface and the second sequential series of images can be rendered on a second user interface. In such embodiments, illumination of the first user interface and the second user interface can be in relatively short bursts, such as bursts having a duration of approximately $0.5 \times 10^{-4}$ seconds.

Figure 10:
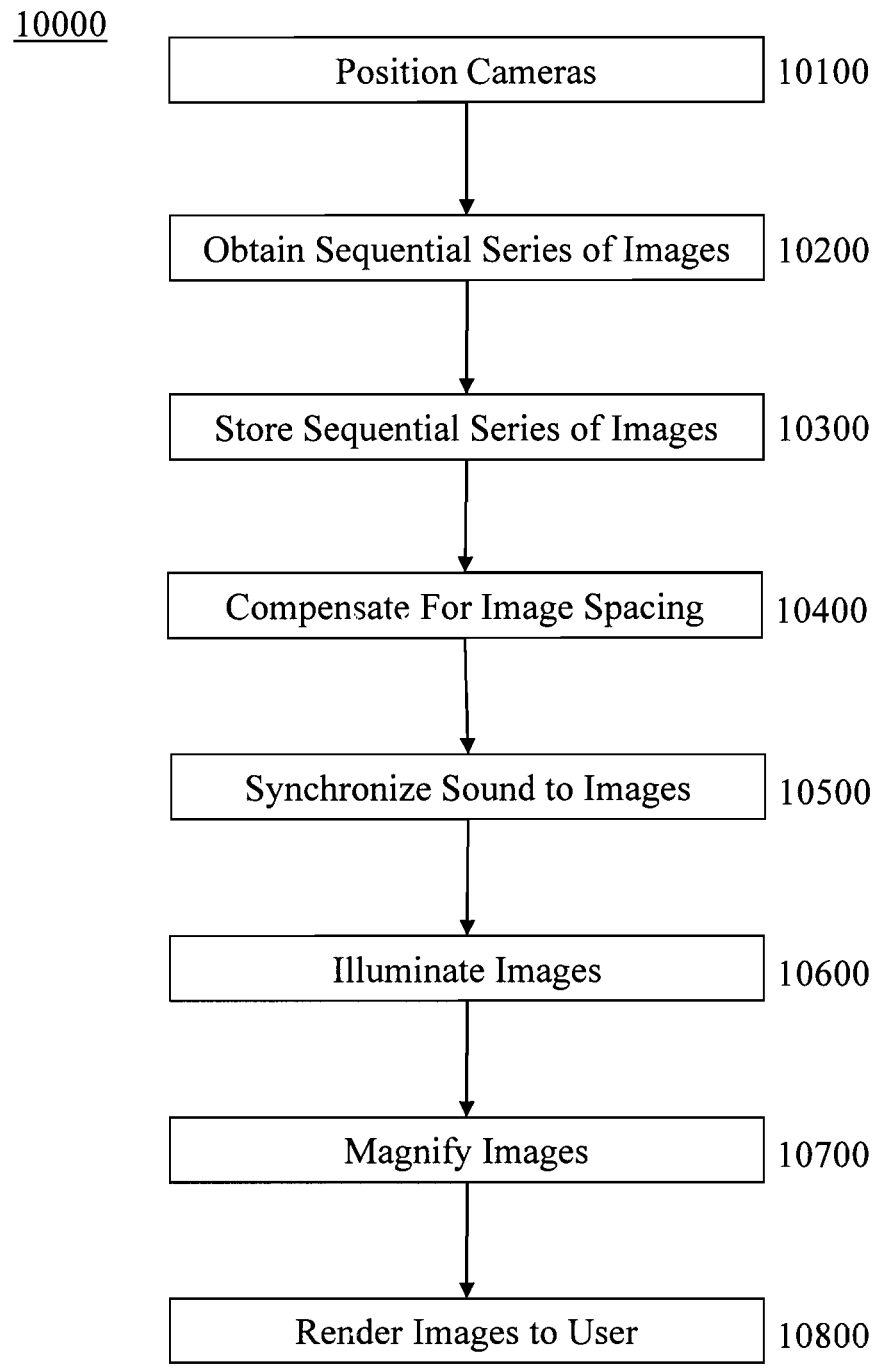
FIG. 10 is a flowchart of an exemplary embodiment of a method 10000.

FIG. 10 is a flowchart of an exemplary embodiment of a method 10000. At activity 10100, cameras can be positioned. Certain exemplary embodiments can cause a centerline of a lens of the first camera to be a predetermined distance from a centerline of a lens of the second camera. In certain exemplary embodiments, the predetermined distance can be approximately 2.5 inches.

At activity 10200, a sequential series of image pairs can be obtained. The image pairs can be obtained from cameras and/or from one or more information devices adapted to generate images. When obtained from cameras, a pair of cameras can be separated by a predetermined distance, such as approximately a distance between a pair of human eyes. In certain exemplary embodiments, image pairs can be generated with a computer, via a mathematical algorithm which is designed to create 3D images. For example, for certain exemplary embodiments can provide movies which are animated but also in 3D. In embodiments wherein images are computer generated, the mathematical algorithm can simulate perspectives such that a left image of an image pair appears substantially as having been viewed from a left eye of a person and a right image of the image pair appears substantially as having been viewed from the right eye of the person. For example, image pairs can be generated via ray tracing and/or other techniques.

At activity 10300, the sequential series of image pairs can be stored. The image pairs can be stored on paper, film, and/or in memory device, etc.

At activity 10400, a compensation can be made for image spacing caused by distances between centerlines of camera lenses, for example, compensation for a separation between camera lenses that differ from a separation between human eyes. In certain exemplary embodiments, such compensation can be made via an information device adapted to perform compensation for image separation based upon one or more mathematical algorithms adapted to modify digital images.

At activity 10500, sound can be synchronized to images, causing a transmission of sound that is substantially synchronized to the first sequential series of images and the second sequential series of images.

At activity 10600, the images can be illuminated. For example, via a signal received from a phototransistor, an illumination of a first light source and a second light source can be automatically triggered. Light energy can be received at a phototransistor. A signal from the phototransistor can be caused by the light energy. The first light source can be adapted to lighten a first image of a first sequential series of images. The second light source can be adapted to lighten a first image of a second sequential series of images. The first image of the first sequential series of images can be rendered side-by-side with the first image of the second sequential series of images. The first sequential series of images can be obtained via a first camera. The second sequential series of images can be obtained via a second camera. The first sequential series of images can be obtained substantially concurrently with the second sequential series of images. The first camera can be separated from the second camera by a predetermined distance. The predetermined distance can be established based upon optical characteristics of a viewer. The viewer can be adapted to render the first sequential series of images and the second sequential series of images. In certain exemplary embodiments, illumination of the first light source and the second light source can be automatically ceased after a predetermined time interval. The first light source and the second light source can be caused to be illuminated for a time interval such that an image being viewed moves approximately $\frac{1}{1000}^{th}$ of its dimension measured in the direction of travel. The signal received from the phototransistor can be generated via light energy transmitted via an aperture in at least one of the first sequential series of images and the second sequential series of images.

At activity 10700, the images can be magnified. Certain exemplary embodiments can cause each of the first sequential series of images and the second sequential series of images to be optically magnified.

At activity 10800, the images can be rendered to a user. For example, a user can view and/or be caused to view the first sequential series of images with a first eye. For example, the first eye can view the first sequential series of images via a first lens system. The user can view and/or be caused to view the second sequential series of images with a second eye. For example, the second eye can view the second sequential series of images via a second lens system. A mirror can be adapted to cause compensation for spacing between the first sequential series of images and the second sequential series of images.

In certain exemplary embodiments, via a substantially gearless mechanism, each of the first sequential series of images and the second sequential series of images can be rendered and/or caused to be rendered to the user. In certain exemplary embodiments, via a substantially pinless mechanism, each of the first sequential series of images and the second sequential series of images can be rendered and/or caused to be rendered to the user. Certain embodiments can cause pairs of the first sequential series of images and the second sequential series of images to be rendered to a user at substantially equal time intervals.

In certain exemplary embodiments, via a signal received from a sensor, an illumination of a first light source and a second light source can be automatically triggered. The first light source can be adapted to lighten a first image. The second light source can be adapted to lighten a second image. The first image can be rendered side-by-side with the second image. The first image can be obtained via a first camera. The second image can be obtained via a second camera. The first image can be obtained substantially concurrently with the second image. The first camera can be separated from the second camera by a predetermined distance. The predetermined distance can be established based upon optical characteristics of a viewer, the viewer comprising the sensor.

Figure 11:
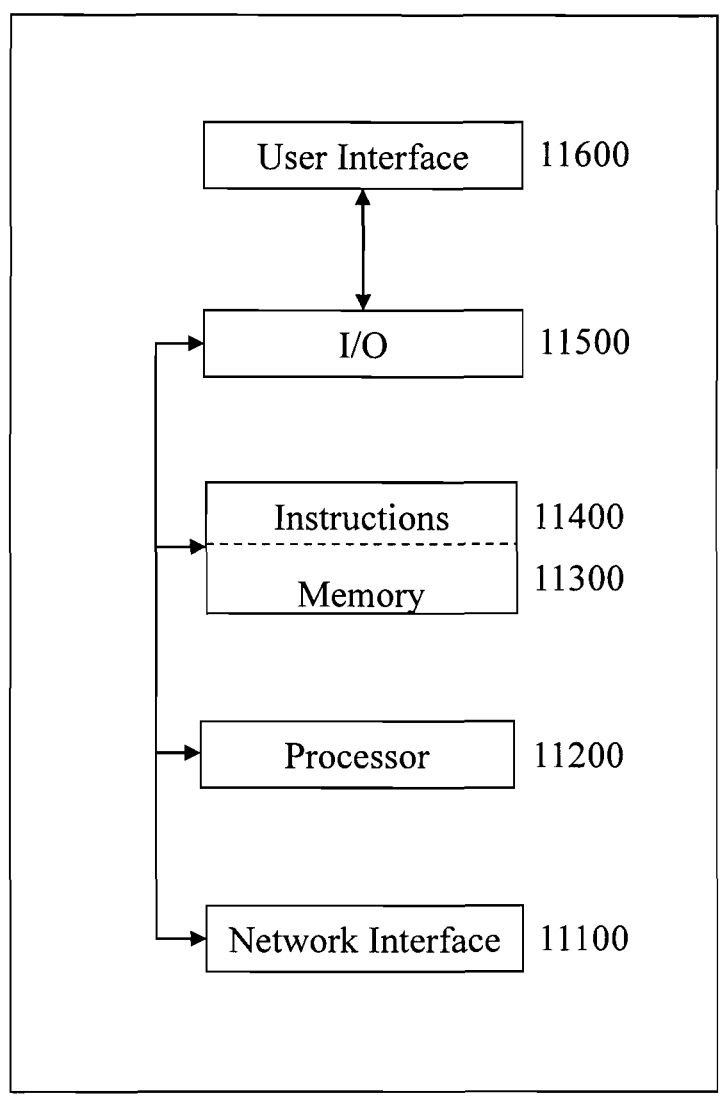
FIG. 11 is a block diagram of an exemplary embodiment of an information device 11000.

FIG. 11 is a block diagram of an exemplary embodiment of an information device 11000, which in certain operative embodiments can comprise, for example, information device 9100, of FIG. 9. Information device 11000 can comprise any of numerous circuits and/or components, such as for example, one or more network interfaces 11100, one or more processors 11200, one or more memories 11300 containing instructions 11400, one or more input/output (I/O) devices 11500, and/or one or more user interfaces 11600 coupled to I/O device 11500, etc.

In certain exemplary embodiments, via one or more user interfaces 11600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, rendering, viewing, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- a—at least one.
- activity—an action, act, step, and/or process or portion thereof.
- adapted to—made suitable or fit for a specific use or situation.
- adapter—a device used to effect operative compatibility between different parts of one or more pieces of an apparatus or system.
- and/or—either in conjunction with or in alternative to.
- aperture—a defined opening through which light is admitted and/or emitted.
- apparatus—an appliance or device for a particular purpose.
- appear—to have an appearance of being.
- associate—to join, connect together, and/or relate.
- automatically—acting or operating in a manner essentially independent of external influence or control. For example, an automatic light switch can turn on upon "seeing" a person in its view, without the person manually operating the light switch.
- camera—a device and/or system adapted to capture images.
- can—is capable of, in at least some embodiments.
- cause—to produce an effect.
- centerline—an imaginary line that passes through a center of a lens surface and that is perpendicular to a surface of the lens at that spot.
- cease—to stop.
- characteristic—a feature, attribute, and/or aspect of something.
- circuit—an electrically conductive pathway and/or a communications connection established across two or more switching devices comprised by a network and between corresponding end systems connected to, but not comprised by the network.
- colored glasses—ocular appliances comprising pigmented lenses.
- compensate—to adjust and/or correct for.
- comprising—including but not limited to.
- concurrently—occurring and/or operating at approximately a same time.
- configure—to make suitable or fit for a specific use or situation.
- connect—to join or fasten together.
- control—to direct and/or determine.
- convert—to transform, adapt, and/or change.
- couple—to link in some fashion.
- create—to bring into being.
- data—distinct pieces of information usually formatted in a special or predetermined way and/or organized to express concepts.
- define—to establish the outline, form, or structure of.
- detect—to discover, determine, find, and/or perceive.
- determine—to obtain, calculate, decide, deduce, and/or ascertain.
- device—a machine, manufacture, and/or collection thereof.
- dimension—extent.
- direction of travel—orientation of movement.
- distance—a numerical description of how far apart objects are.
- equal—substantially similar to.
- eye—an organ of sight of an animal.
- gearless mechanism—a device and/or system that substantially lacks any toothed wheel adapted to engage with a toothed mechanism.
- generate—to create, produce, give rise to, and/or bring into existence.
- haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
- illumination—lighting from a natural and/or artificial light source.
- image—a visual representation produced on a surface.
- image generator—a device and/or system adapted to create an image.
- image perspective—a spatial location from which an image is viewable.
- information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

lens—an at least partially transparent optical device used to converge or diverge transmitted light.

lighten—to illuminate via a light source.

light energy—electromagnetic radiation that can produce a visual sensation.

light source—a device and/or system adapted to serve as a source of illumination.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

magnify—to make an object and/or image of an object appear larger.

may—is allowed and/or permitted to, in at least some embodiments.

measure—to determine an extent of media—storage and/or transmission devices and/or systems adapted to store and/or deliver information.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

mirror—a device adapted to reflect light energy.

motion—relocation from a first position to a second position.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

object—a thing having substance.

optical—relating to or involving light and/or the transmission of light.

pairs—sets of two.

perspective—a manner in which objects and/or images of objects appear to an eye based on spatial attributes of the objects and/or images of objects; dimensions of the objects and/or images of objects; and/or a location of an actual or virtual eye relative to the objects and/or images of objects.

phototransistor—a type of photodetector capable of converting light into current and/or voltage.

polarized glasses—ocular appliances comprising lenses adapted to filter light rays having predetermined orientations.

pinless mechanism—a device and/or system that substantially lacks any pins adapted to engage media comprising one or more images.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

receive—to get as a signal, take, acquire, and/or obtain.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

representation—an image.

request—to express a desire for and/or ask for.

responsive—reactive to a stimulus.

sequential series—an ordered consecutive list of elements.

set—a related plurality.

side-by-side—placement of two images next to one another for viewing.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

sound—mechanical vibrations transmitted via a medium.

space—to separate by a predetermined distance.

store—to place, hold, and/or retain data, typically in a memory.

substantially—to a great extent or degree.

support—to bear the weight of, especially from below.

synchronize—to adjust in time or manner relative to an event.

system—a collection of mechanisms, devices, machines, articles of manufacture, processes, data, and/or instructions, the collection designed to perform one or more specific functions.

three dimensional—having an appearance with length, width, and depth time interval—period of time with defined limits.

transmit—to send as a signal, provide, furnish, and/or supply.

trigger—to set a course of events in motion.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

viewer—a device and/or system adapted to render a set of images.

Notes

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising a plurality of activities, comprising:
via a signal received from a phototransistor, said signal responsive to light transmitted through a hole in an image medium, automatically triggering a brief flash of a first light source and a brief flash of a second light source, said first light source adapted to lighten a first image of a first sequential series of images, said second light source adapted to lighten a first image of a second sequential series of images, said first image of said first sequential series of images rendered side-by-side with said first image of said second sequential series of images, said first sequential series of images obtained via a first camera, said second sequential series of images obtained via a second camera, said first sequential series of images obtained substantially concurrently with said second sequential series of images, said first camera separated from said second camera by a predetermined distance, said predetermined distance established based upon optical characteristics of a viewer, said viewer adapted to render said first sequential series of images and said second sequential series of images.

2. The method of claim 1, further comprising:
causing a centerline of a lens of said first camera to be approximately 2.5 inches from a centerline of a lens of said second camera.

3. The method of claim 1, further comprising:
receiving light energy at said phototransistor, said signal caused by said light energy.

4. The method of claim 1, further comprising:
automatically ceasing illumination of said first light source and said second light source after a predetermined time interval.

5. The method of claim 1, further comprising:
causing a user to view said first sequential series of images with a first eye; and
causing said user to view said second sequential series of images with a second eye.

6. The method of claim 1, further comprising:
via a first lens system, causing a user to view said first sequential series of images with a first eye; and
via a second lens system, causing said user to view said second sequential series of images with a second eye.

7. The method of claim 1, further comprising:
causing each of said first sequential series of images and said second sequential series of images to be optically magnified.

8. The method of claim 1, further comprising:
via a substantially gearless mechanism, causing each of said first sequential series of images and said second sequential series of images to be rendered to a user.

9. The method of claim 1, further comprising:
via a substantially pinless mechanism, causing each of said first sequential series of images and said second sequential series of images to be rendered to a user.

10. The method of claim 1, further comprising:
causing a transmission of sound that is substantially synchronized to said first sequential series of images and said second sequential series of images.

11. The method of claim 1, further comprising:
via a mirror, causing compensation for spacing between said first sequential series of images and said second sequential series of images.

12. The method of claim 1, further comprising:
causing said first light source and said second light source to be illuminated for a time interval such that an image being viewed moves approximately $1/1000^{th}$ of its dimension measured in the direction of travel.

13. The method of claim 1, wherein:
said signal received from said phototransistor is generated via light energy transmitted via an aperture in at least one of said first sequential series of images and said second sequential series of images.

14. The method of claim 1, wherein:
causing pairs of said first sequential series of images and said second sequential series of images to be rendered to a user at substantially equal time intervals.

15. A method comprising a plurality of activities, comprising:
via a signal received from a sensor, said signal responsive to light transmitted through a hole in an image medium, automatically triggering a brief flash of a first light source and a brief flash of a second light source, said first light source adapted to lighten a first image, said second light source adapted to lighten a second image, said first image rendered side-by-side with said second image, said first image obtained via a first camera, said second image obtained via a second camera, said first image obtained substantially concurrently with said second image, said first camera separated from said second camera by a predetermined distance, said predetermined distance established based upon optical characteristics of a viewer, said viewer comprising said sensor.

16. A system, comprising:

a viewer, said viewer comprising:

a first image aperture;

a second image aperture;

a first light source adapted to, based upon a received signal corresponding to a first image of a first sequential series of images, briefly flash to lighten said first image of said first sequential series of images, said first sequential series of images viewable via said first image aperture, said received signal responsive to light transmitted through a hole in an image medium, said received signal one of a plurality of received signals, each of said plurality of received signals corresponding to an image of said first sequential series of images; and a second light source adapted to, based upon said received signal, briefly flash to lighten a first image of a second sequential series of images, said second sequential series of images viewable via said second image aperture, said first image of said first sequential series of images rendered side-by-side with said first image of said second sequential series, said first sequential series of images obtained via a first image generator, said second sequential series of images obtained via a second image generator, said first image generator adapted to obtain said first sequential series of images from a first image perspective, said second image generator adapted to obtain said second sequential series of images from a second image perspective, a distance between said first image perspective and said second image perspective established based upon optical characteristics of said viewer.

17. The system of claim 16, further comprising:

said first image generator; and said second image generator.

18. The system of claim 16, further comprising:

media comprising said first sequential series of images and said second sequential series of images.

19. The system of claim 16, further comprising:

an information device adapted to control a rendering of said first sequential series of images and said second sequential series of images via said viewer.

20. The system of claim 16, wherein:

said system is adapted to render a representation of motion of objects a having a three dimensional appearance without colored glasses or polarized glasses.

21. A method comprising a plurality of activities, comprising:

via a signal received from a sensor, said signal responsive to light transmitted through a hole in an image medium, automatically triggering a brief flash of a first light source and a brief flash of a second light source, said first light source adapted to lighten a first image, said second light source adapted to lighten a second image, said first image rendered side-by-side with said second image, wherein said first image and said second image are computer generated images placed on a film, said first image rendered from a first perspective, said second image rendered from a second perspective, said first perspective separated from said second perspective by a predetermined distance, said predetermined distance established based upon optical characteristics of a viewer, said viewer comprising said sensor, said first image and said second image appearing to a user using said viewer to have been obtained from a first camera and a second camera that are separated by said predetermined distance.

* * * * *